Aug. 3, 1937.     P. W. BROWN     2,089,168
SPLINE CONNECTION
Filed Oct. 12, 1934

INVENTOR.
PERRY W. BROWN
BY
ATTORNEY.

Patented Aug. 3, 1937

2,089,168

UNITED STATES PATENT OFFICE 2,089,168

SPLINE CONNECTION

Perry W. Brown, Ridgewood, N. J.

Application October 12, 1934, Serial No. 748,110

5 Claims. (Cl. 287—52.05)

This invention comprises improvements in spline connections, and is particularly adaptable to rotary driving connections subject to rapidly alternating driving torque. In certain respects the invention comprises improvements on my co-pending application, Serial Number 689,070.

In that application there is disclosed a novel form of side fitting tapered splines of involute section and helical form which may be accurately and cheaply produced on standard helical gear cutting machines. In common with tapered connections in general, the parts are drawn together axially, as by means of a nut on the shaft, and accordingly a certain allowance must be made for "draw", i. e., the axial movement of the parts which occurs in between initial contact and complete tightness, and for this reason the axial location of the hub member upon the shaft is subject to variation which may be disadvantageous where it is desired to clamp another member axially by means of the hub member as is often done where parallel splines are used.

Accordingly, a prime object of the present invention is to realize the advantages of the side tapered spline construction while still permitting an accurate pre-determined axial location for the hub member and to also permit this member to be used to clamp an associated part upon the shaft.

Other objects will be obvious from, or will be pointed out in the following description.

Figures 1, 2:
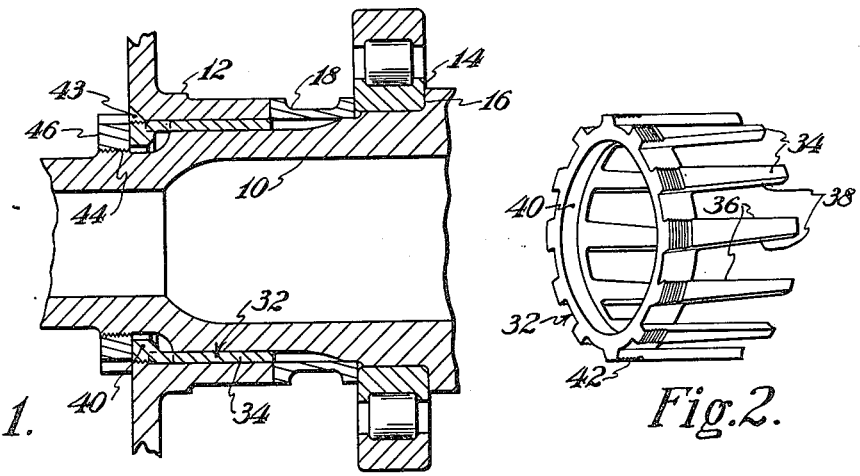
Fig. 1 is a fragmentary axial section through a shaft carrying a hub member according to the present invention.
Fig. 2 is a perspective view of the intermediate tapered spline member of the invention.

In these figures, 10 designates a portion of a shaft, in this case the crankshaft of an aircraft engine, and 12 designates the hub of a member to be secured to the shaft against looseness under shock loading or reversing driving effort.

The crankshaft 10 also carries a bearing 14 which is to be pinched against a shoulder 16 by the hub 12 through a distance piece 18, which could not be conveniently done with the side tapered spline organization disclosed in my co-pending application without the use of a separate bearing lock nut and screw thread on the shaft, due to the relatively indeterminate axial location of the hub on the shaft.

Figures 3, 4:
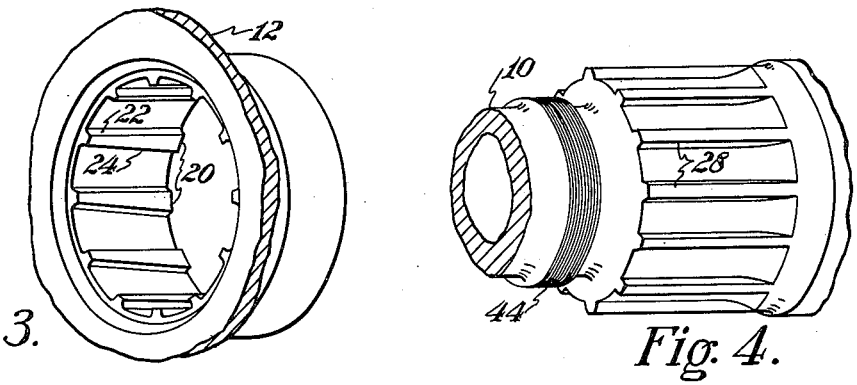
Fig. 3 is a perspective view illustrating the side tapered splines in the hub member.
Fig. 4 is a perspective view of the splines on the shaft.
Figure 5:
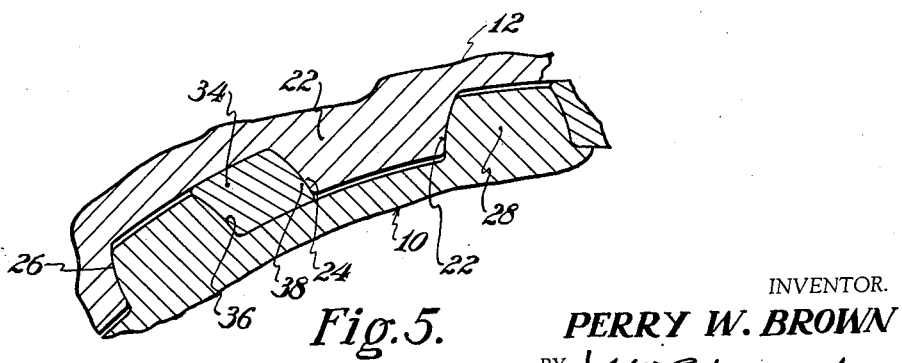
Fig. 5 is an enlarged fragmentary transverse section through the three main elements of the invention.

Referring now to the perspective view, Fig. 3, it will be seen that the hub has formed within its bore, splines 20, one side of each being parallel with the hub axis as indicated at 22, while the other side of each is formed helically as at 24 giving a side tapered spline. The sectional profile of the splines, preferably comprise involute curves as indicated at 26, Fig. 5, whereby the splines may be generated by the methods already developed for the economic production of helical gears.

The shaft 10 (Fig. 4) is equipped with parallel splines 28 having involute side faces, and the space defined between these splines is substantially greater than the greatest width of the hub splines 22. These spaces are filled by fingers 34 formed on an intermediate member 32 (Fig. 2), one side of each finger being cut parallel to the shaft axis as indicated at 36, the opposite side 38 being cut to the same helix angle as the helical sides 24 of the hub member splines 20. These fingers or wedges 34 are cut from a tubular piece which initially has a reduced internal diameter which serves to support the fingers 34 during the cutting operation. The side faces of the fingers are complementary in shape to the faces of the splines 22 and 28 with which the fingers engage. The material under nearly all of each finger length is then removed by a boring operation leaving the fingers projecting as shown in Fig. 2 from an integral ring 40 by which they are all united. The ring 40 may be provided with threads 42 for a puller nut (not shown) for disassembly. The forward end of the hub is relieved as at 43 to permit the screwing of the puller nut on to the threads 42. During assembly, the threads 42 are not used.

The shaft 10 is provided with threads 44 for a nut 46 which abuts the end of the ring 40 but clears the hub 12. When the parts are being assembled and the nut 46 is tightened against the member 32, the fingers 34 engaging the tapered sides 24 of the hub splines 22 carry the hub 12 along until it abuts on the distance piece 18. Further tightening of the nut 46 then accomplishes two results; (a) the tapered fingers 34 are wedged circumferentially in the tapered spaces between the hub splines 22 and the shaft splines 28 and (b) the axial pressure from the nut also forces the hub 12 firmly against the distance piece 18 thus clamping the bearing race 14 against the shoulder 16.

It will be seen that, by this means, a tight circumferential driving fit is insured between the hub and the shaft while at the same time the hub member may be drawn up to any predetermined axial location as against a member to be clamped.

It will also be seen that, by the helical and involute conformation of the tapered sides of the splines, the parts may be accurately produced in suitable fixtures on helical gear cutting machines. The involute form of the spline sides is desirable from a production viewpoint, as described in said co-pending application, but is not essential to this invention. Other spline side forms might also be used.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

What is claimed is:

1. The combination with a shaft having splines, of a hub having splines contacting with the shaft splines on one side only and spaced from the shaft splines on the other side, said splines including a helical side whereby said space tapers, and a wedge member comprising fingers adapted when drawn up axially to fill said space to secure the parts circumferentially by wedging action.

2. A hub-to-shaft coupling comprising splines formed on said shaft substantially parallel to the shaft axis, splines formed within said hub each having one side parallel to and engaging a corresponding side of one said shaft spline, the other side of each said hub spline being spaced from and tapered with respect to the facing side of said shaft spline, and fingers tapered in complement to the thus formed inter-spline spaces adapted to be wedged within said spaces to lock said hub and shaft from relative rotational motion.

3. In combination with a shaft having a shoulder and having splines formed thereon substantially parallel to the shaft axis, a hub having a part abutting said shoulder and having internal splines, each said hub spline having a side face parallel to and engaging a side face of a shaft spline, and each said hub spline having an opposite side face tapered relative to the facing side of a shaft spline to form between said sides a tapered space, and tapered fingers forced into said tapered spaces to enforce abutment of said hub against said shaft shoulder and to lock the hub against rotational looseness of said shaft.

4. In a shaft-hub connection, a splined shaft member, a splined hub member, the splines of one member being tapered longitudinally and the splines of one member lying in circumferentially spaced relation between the splines of the other member to form tapered spaces between said splines, and tapered fingers forced within the tapered interspline spaces to lock said hub and shaft from relative rotation.

5. In a shaft-hub connection, a splined shaft member, a splined hub member, the splines of one member being tapered longitudinally and the splines of one member lying in circumferentially spaced relation between the splines of the other member to form tapered spaces between said splines, tapered fingers forced within the tapered interspline spaces to lock said hub and shaft from relative rotation, and coacting abutments on said shaft and hub for axial location thereof.

PERRY W. BROWN.